UNITED STATES PATENT OFFICE.

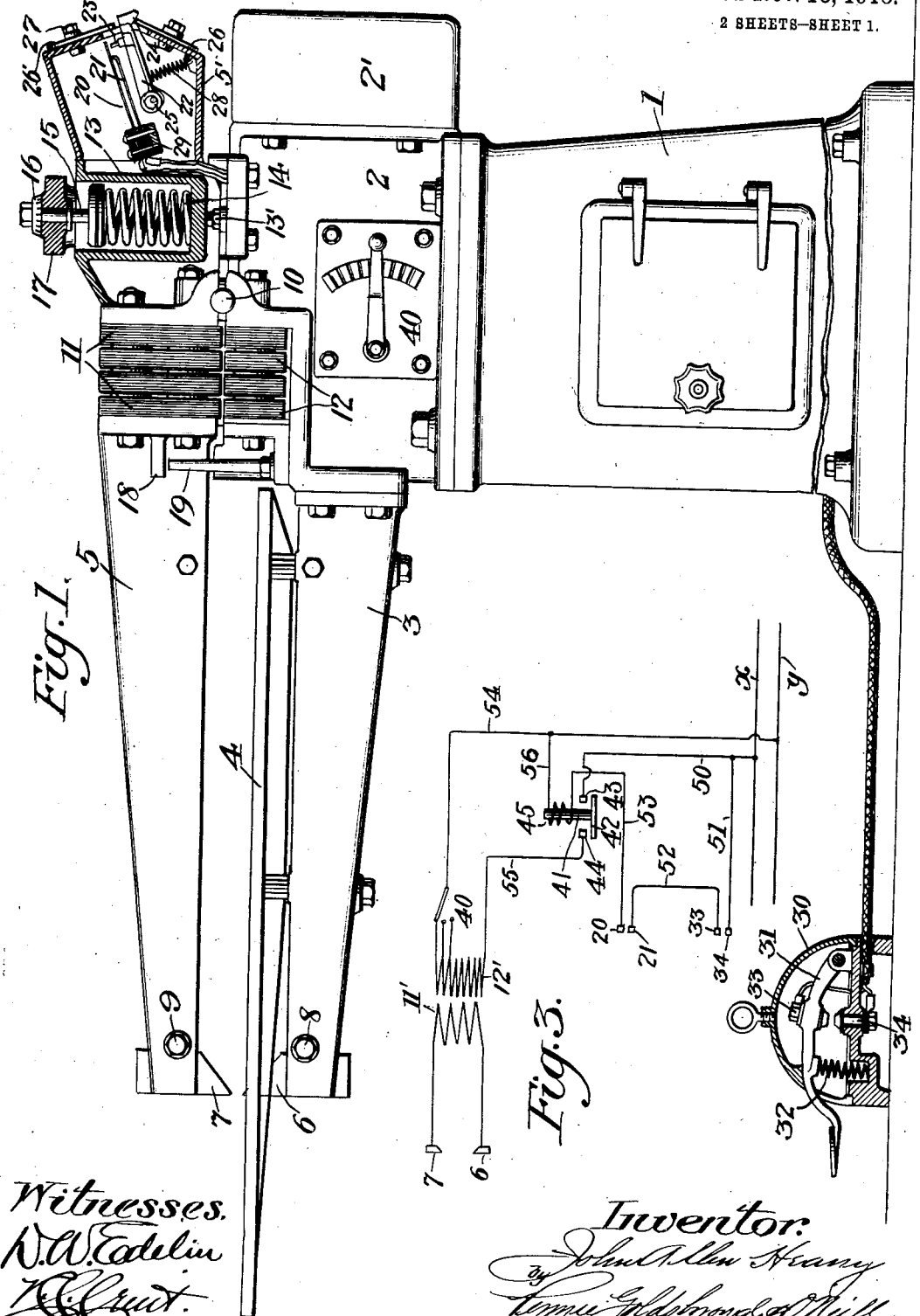

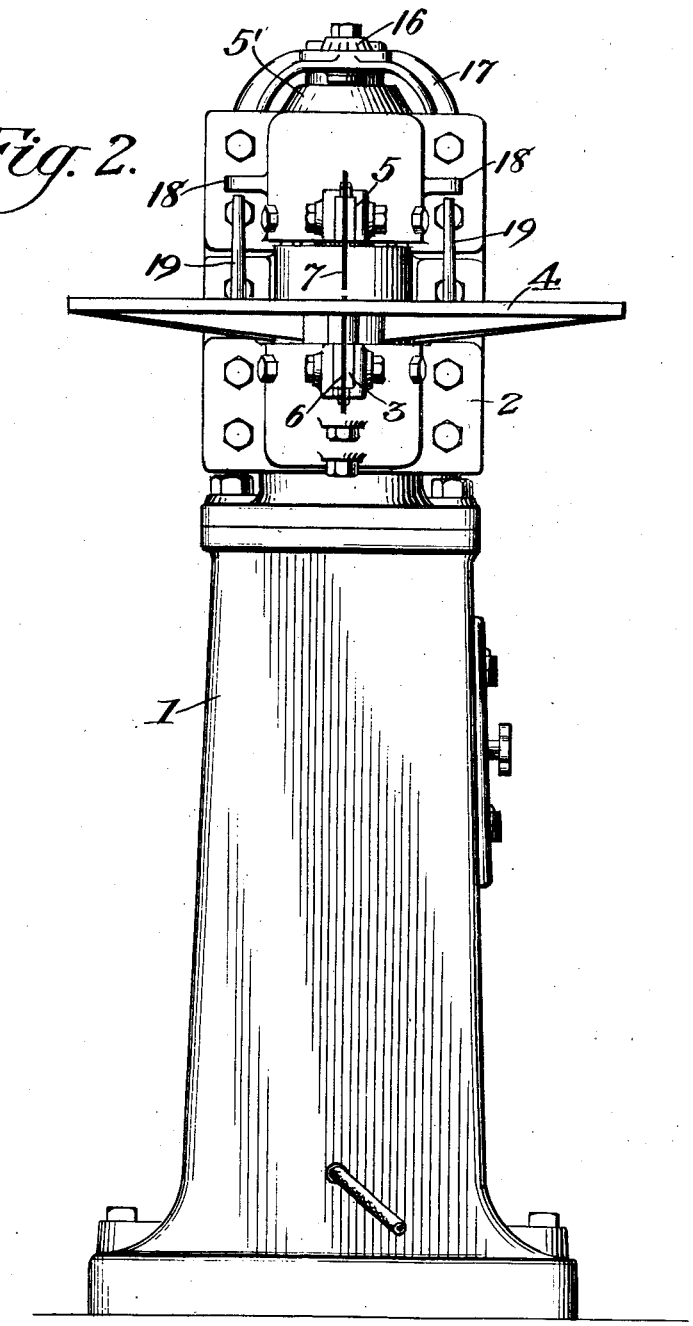

JOHN ALLEN HEANY, OF WASHINGTON, DISTRICT OF COLUMBIA.

ELECTRICAL WELDING APPARATUS.

1,078,675.

Specification of Letters Patent. Patented Nov. 18, 1913.

Application filed July 28, 1913. Serial No. 781,596.

*To all whom it may concern:*

Be it known that I, JOHN ALLEN HEANY, a citizen of the United States, residing in the city of Washington, District of Columbia, have invented certain new and useful Improvements in Electrical Welding Apparatus; and I do hereby declare the following to be a full, clear, and exact description of the invention, such as will enable others skilled in the art to which it appertains to make and use the same.

The invention relates to electric welding apparatus, and more particularly to rapidly operating spot welders designed to effect welds between pieces of the work to be joined at any desired space intervals, the duration of the current for each weld being accurately regulated by a timing device to insure perfect, uniform welds throughout.

To these ends, the machine comprises two relatively movable arms, each carrying a special form of welding electrode, electro-magnetic means, preferably constituted by the divided core of a welding transformer, the core sections being secured to the respective arms aforesaid so that when the transformer is energized, the core sections are attracted and serve to effect the relative movement of the arms and bring the electrodes into welding relation, an adjustable timing device actuated by the impact of a movable arm to regulate the duration of the welding current, means to oppose the electro-magnetic force tending to bring the arms together, and thereby regulate the pressure between the work and the electrodes, and means under the control of the operator for closing the circuit to the power source at will. The coaction of these instrumentalities results in a machine capable of effecting spot welds of any desired extent with the maximum rapidity of operation and absolute uniformity of results.

In the accompanying drawings, Figure 1 is a side elevation partly in section of a simple form of apparatus embodying the invention. Fig. 2 is a front elevation thereof, and Fig. 3 is a diagram of the circuits and accessories.

Referring to the drawings, 1 indicates the base of the machine, which is preferably in the form of a hollow pillar or standard, to the top of which is secured a box-like casing 2 having secured to the rear wall thereof an auxiliary casing 2'. To the front wall of the casing 2 is secured a horizontal horn-like arm 3 to the top of which is bolted a flat table 4 to receive the work. Journaled on a short shaft 10 mounted in the top wall of the casing 2 is a second horn-like arm 5 capable of movement in a vertical plane about the axis of said shaft 10.

In the forward end of the respective arms 3 and 5 are secured welding electrodes 6 and 7 of any appropriate material, which are adjustably clamped in slots in the forward ends of the respective arms by bolts 8 and 9. These electrodes 6 and 7 may be conveniently formed as flat plates having tapering lower edges so that by either interchanging the electrodes or filing off the points or tips thereof, any degree or extent of surface contact between the respective electrodes and the work may be effected. Likewise when the electrodes become worn by use, they may be brought back to the proper form by filing or otherwise dressing the adjacent taper surfaces to produce the desired surface contact at the electrodes.

Formed as constituent parts of the lower stationary portion of the machine, adjacent the lower arm 3 and of the upper movable arm 5 is a welding transformer the lower portion 12 of which is mounted on the casing 2 to the rear of the arm 3 and the upper member of which is built into the upper arm 5 in vertical alinement with the lower section 12, so that the laminate cores of the sections 11 and 12 are normally separated from each other by a narrow air gap. The windings of the transformer may be applied in any desired or convenient manner, but preferably they will be so disposed on the respective core sections that the primary winding is located on the lower core section 12 and the secondary winding on the upper core section 11. The effect of this construction is that when the transformer is energized, the core sections thereon will exercise a mutual attraction and cause the upper arm 5 to swing downward on its pivot 10 and bring its electrode 7 into engagement with the work carried by the table 4 and impose just the proper degree of pressure between the electrodes and the pieces to be welded, to effect the welding operation.

In order to accurately regulate the degree of contact pressure between the electrodes and the work and also to serve as a convenient means for retracting the upper movable arm from the work after each weld has been completed, there is provided a mechanical counterbalancing device which preferably consists of a helical spring 14 mounted in the vertical recess or chamber 13 formed in the rear portion of the arm 5 behind the pivot 10, the tension of which spring may be accurately adjusted by means of a bolt 15, mounted in an arch-shaped yoke rising from the top of the casing 2, said bolt being provided with a set nut and gage plate 16 bearing upon the top of the yoke. When a relatively light pressure is desired between the welding electrodes and the work, the tension on the spring 14 may be increased by adjusting the nut 16 and vice versa, when a heavier pressure is desired, the tension of the spring may be appropriately relieved by setting up the nut in accordance with the indications on the gage plate associated therewith. When no current is on the welding apparatus, the spring 14 serves to lift the arm 5 away from table 4.

In performing particularly delicate welding operations between thin metal sections, great difficulty has been encountered in regulating the duration of the current flowing from the electrodes through the portions of the metal to be welded, so that in the former types of machines, the metal at the weld was either badly burned or imperfect joints resulted. In certain classes of work in which rapidity of operation, economy of current and perfection and uniformity of welds are essential, it has been found that the duration of the welding current through the electrodes must be limited to a fraction of a second. Obviously, such an extremely narrow time limit is beyond possibility of realization by hand control of even the most skilled operator, for although a perfect weld might be obtained occasionally, the personal control of the time factor would reduce the speed efficiency of the apparatus and what is more serious, result in irregular and uniform welds. Special provision is made in the present machine, however, to permit the accurate adjustment of the periods of time when the current is flowing between the electrode within and, if necessary, to a small fraction of a second, so that absolutely uniform welds will result and the machine may be operated at a very high rate of speed. To effect this result, the timing device indicated on the upper rear portion of the machine is provided, said timing device comprising the following instrumentalities: Interposed in the relay circuit leads are two spring contact members 20 and 21, mounted in a supporting block 29 carried by the removable housing 5' on the rear of the pivoted arm 5. Said contact springs are normally in engagement so that the circuit is normally closed between them. Pivoted on eccentric bearing 25 below the contact members 20, 21, is a lever 22 provided at its outer end with a tapered or inclined shoulder 24, which tapered shoulder normally rests against the upper edge of a permanent magnet 26 secured to the outer wall of the housing 5'. Mounted on the upper side of the lever 22 is a stud 23 adapted to engage the projecting end of spring 20 and lift said spring out of electrical engagement with spring 21. A second permanent magnet 26' secured to the rear wall of the housing 5' serves as an upper limit stop for the lever 22. The two magnets effectively prevent any chattering or vibration of the lever 22. The movement of the lever 22 in the direction of the spring contacts 20 and 21 is effected by the kick or momentum produced by the impact of arm 5 in its downward movement, or more particularly by the shock transmitted to said arm by the electrode 7 impinging upon the work. When the arm is moved forcibly by the attraction of the core sections of the transformer, the electrode 7 strikes against the work and the shock of impact is transmitted throughout the arm 5 and casing 5' to the lever 22 with the result that the latter swings upward on its pivot 25 and the abutment 23 engages spring 20 and lifts the same out of engagement with spring 21. To amplify the shock produced by downward movement of the arm 5 there is preferably provided on each side of said arm a lug 18 adapted to impinge on the top of an alining vertical adjustable post or abutment 19 secured to the upper face of the machine to the rear of the table 4. The time that it takes the lever 22 to swing from its lower position of rest until the abutment 23 on said lever engages and lifts spring 20 out of contact with spring 21 may be accurately regulated by adjusting the eccentric bearing 25 of said lever, which has the effect of moving the lever backward and forward so that the inclined face 24 on the end thereof slides on the upper edge of the magnet 26 and the abutment 23 is brought nearer to or carried farther away from the outer end of spring 20 as said lever is moved in or out. The upper magnet 26' serves to hold the lever in its upper position with the abutment 23 separating springs 20 and 21 until the upper arm 5 is swung to its upper position by the action of spring 14, which position is determined by a stop lug 13' which is impinged by the bottom of the recess 13, thereby producing a sufficient shock or jar to overcome the attraction between the end of lever 22 and the upper magnet 26 and allow said lever, under the tension of its spring 28, to return to its lower position.

Inasmuch as the duration of the current flow to the primary of the transformer is dependent upon the time interval between the closing of the circuit to the primary and the movement of lever 22 to cause abutment 23 thereon to impact spring 20 and disengage said spring from its coöperating contact spring 21, it will be apparent that by accurately adjusting the distance which lever 22 has to move before it separates springs 20 and 21, the time which the current is permitted to flow to the primary may be regulated with corresponding accuracy. This adjustment is effected, as hereinbefore described, by turning the eccentric bearing 25 of said lever, thereby moving the latter in or out, as the case may be, and causing the inclined edge 24 thereon to ride up or down on the upper edge of the lower limit magnet 26.

On the side of the casing 2, there is mounted a current regulator 40 for regulating the strength of the current developed by the transformer. Within the auxiliary housing 2', there is provided a suitable form of contactor relay which is diagrammatically illustrated in Fig. 3.

Associated with the mechanism is a suitable foot switch comprising a portable casing 30 in the bottom of which is mounted a stationary contact 34 and within which casing is pivotally mounted a treadle 31 which is normally lifted by spring 32, said treadle carrying an insulated contact 33. The contacts 33 and 34 are interposed in a lead from one of the current supply mains.

The circuits of the apparatus are illustrated in Fig. 3, in which x and y illustrate the supply mains. Connected to main y is a lead 54 which is connected to the handle of the current regulator 40, the fixed contacts of which are connected to sections of the primary winding of the transformer so that by adjusting the handle of the regulator any desired number of primary sections may be included in the circuit. To the main x there is connected a lead 50 from which passes a branch 51 to the lower contact 34 of the foot switch 30. From the upper contact 33 of the switch 30 a lead 52 passes to contact spring 21 of the timing device and from the contact spring 20 of the timing device a lead 53 passes to the magnet coil 45 of the contactor relay, the other terminal of which coil is connected by lead 56 with lead 54. The armature or core 41 of the magnet 45 is provided with a bridging contact 42 adapted to engage stationary contacts 43 and 44 interposed between lead 50, and a lead 55 connecting one terminal of the primary winding 12'.

The operation of the apparatus is as follows: The work to be welded is placed on the table 4 and adjusted so as to bring the portions to be welded successively between the welding electrodes 6 and 7. For each welding operation, the operator depresses foot treadle 31, thereby closing the circuit from the mains as follows: From main x by way of leads 50 and 51 to the lower contact 34 of foot switch 30, thence through upper contact 33 and lead 52 through contacts 20 and 21 to the timer, lead 53 to the coil 45 of the contactor relay, thence by leads 53 and 54 to main y. The passage of current through the coil 45 energizes the relay and attracts its core, thereby bridging contacts 43 and 44 by bridge piece 42 and closing a circuit from main x by way of lead 50, contact 43, bridge-piece 42, contact 44, lead 55, through the primary 12' of the transformer, thence through the regulator 40 and back by way of lead 54 to main y. As soon as the primary of the transformer is energized, the core section thereof attracts the core section of the secondary 11' and moves the arm 5 downward until the electrode 7 impinges the work and until the lugs 18 strike the abutment posts 19. The current flowing through the primary 12' of the transformer induces current in the secondary 11' of the transformer which passes to and from the electrodes 6 and 7 by suitable leads or conductors connecting the terminals of the secondary with said electrodes. As soon however, as the upper welding electrode 7 engages the work and the stop lugs 18 strike the posts 19, the shock of impact is transmitted to the arm 5 and, as hereinbefore described, causes lever 22 to react and move upward so that its stud or abutment 23 engages spring 20 and raises the latter out of contact with spring 21. This breaks the circuit through the coil 45 of the contactor relay and the armature of the latter immediately drops or is retracted and breaks the circuit at contacts 43 and 44 through the primary of the transformer. Immediately current ceases to flow in the primary of the transformer, the latter is de-energized, the attraction between the core sections of the transformer ceases and the spring 14 associated with arm 5 immediately returns said arm to its upper position. As the rear portion of the arm 5 descends and engages stop lug 13', the impact causes the outer end of lever 22 to jar loose from its engagement with upper limit magnet 26' and said lever falls to its lower position, as indicated in the drawings. This series of operations is repeated for each weld.

Inasmuch as the time constant of the contactor relay and of the secondary is fixed for a given current, it is apparent that the duration of time in which the current is supplied from the mains to the primary of the transformer is dependent solely upon the timing device consisting of the spring contacts 20, 21 and the lever 22, which latter is operated by the impact due to the downward movement of the upper arm 5. As the timing lever 22 may be adjusted to operate within a small fraction of a second, as hereinbefore described, it will be apparent that the duration of flow of current in the primary of the transformer may be regulated within the same limit. Moreover, inasmuch as the degree of force or impact produced by the downward movement of the upper arm 5 can be nicely regulated by the magnetic pull between the core sections of the transformer and the opposing force of the adjustable spring 14, it will be apparent that the periods of operation of the timer may be made absolutely uniform and limited to any desired duration. It will also be noted that the degree of pressure between the upper movable electrode 7 and the work is dependent upon the magnetic pull between the sections of the transformer core as opposed by the adjustable spring 14, so that by regulating the tension of the opposing spring 14, the pressure applied at the weld may be accurately regulated to a proper degree to effect the best results.

From the foregoing description of the operation of the welding apparatus, it will be apparent that not only the volume of current flowing through the work between the welding electrodes 6 and 7 may be accurately determined, but the time interval required to effect a perfect weld may be accurately fixed. So long as the foot switch is held closed by the operator, the apparatus will continue to work at positively fixed intervals to effect successive spot welds, so that by moving the work between successive downward movements of the upper arm 5, the welds may be produced at any desired position or space intervals and if desired, may be so closely spaced as to produce a practically continuous homogeneous joint between the parts of the work. On the other hand, if a single weld or a series of relatively widely spaced welds is required, the foot switch may be closed only during the interval of the time required for a single weld, then released, and subsequently closed for the next succeeding weld and so on. It will also be apparent that the rapidity of operation of the movable arm and the timing mechanism will admit of a series of absolutely uniform welds being effected at a high rate of speed so that an operator possessing ordinary skill will be enabled to turn out a far greater amount of perfect work than is possible of realization in any of the old types of welding apparatus.

What I claim is:—

1. Electric welding apparatus comprising relatively movable arms carrying welding electrodes, electro-magnetic means to effect the relative movement for the welding operation, and a timing device to determine the duration of the welding current.

2. Electric welding apparatus comprising relatively movable arms carrying welding electrodes, electro-magnetic means to effect the relative movement for the welding operation, mechanical means to oppose the action of said electro-magnetic means to any desired extent, and a timing device to determine the duration of the welding current.

3. Electric welding apparatus comprising relatively movable arms carrying welding electrodes, electro-magnetic means to effect the relative movement for the welding operation, a regulable spring device to oppose the action of said electro-magnetic means, and a timing device to determine the duration of the welding current.

4. Electric welding apparatus comprising relatively movable arms carrying welding electrodes, and a transformer having sections of its core associated with the respective arms whereby energization of the transformer will cause the core sections to approach each other to effect the welding operation.

5. Electric welding apparatus comprising relatively movable arms carrying welding electrodes, means to effect the relative movement of said arms for the welding operation, and a timing device actuated by the impact of the relatively moving arms to regulate the duration of the welding current.

6. Electric welding apparatus comprising relatively movable arms carrying welding electrodes, means to effect the relative movement of said arms for the welding operation, and an adjustable timing device actuated by the impact of the relatively moving arms to regulate the duration of the welding current.

7. Electric welding apparatus comprising relatively moving arms carrying welding electrodes, electro-magnetic means to effect the relative movement of said arms for the welding operation, and a timing device actuated by the impact of the relative removable arms to regulate the duration of the welding current.

8. Electric welding apparatus comprising relative movable arms carrying welding electrodes, a transformer having sections of its core associated with the respective arms whereby energization of the transformer will effect the relative movement of said arms, and a timing device actuated by the impact of the arms to regulate the duration of the welding current.

9. Electric welding apparatus comprising a stationary work-supporting member carrying a welding electrode, a pivoted arm carrying a coöperating electrode, a welding transformer having adjacent core sections carried by the fixed and movable members respectively, and serving to move the arm to welding position when the transformer is energized, and means to retract said arm when the transformer is deënergized.

10. Electric welding apparatus comprising a fixed member and a movable member each carrying a welding electrode, and a timing device operated by the impact of the relatively moving members, said timing device including normally closed electric contacts in the supply circuit, a movable lever for opening said contacts, and means for regulating the extent of movement of said lever to determine the duration of the current through said contacts.

11. Electric welding apparatus comprising a fixed member and a movable member each carrying a welding electrode, and a timing device operated by the impact of the relatively moving members, said timing device including normally closed electric contacts in the supply circuit, a pivoted lever coöperating with said contacts to open the same, and means for regulating the extent of movement of said pivoted lever necessary to effect the opening of said contacts and thereby determine the duration of the current through said contacts.

12. Electric welding apparatus comprising a fixed member carrying a welding electrode, a movable arm carrying a coöperating electrode and pivoted to said fixed member, and a timing device carried by said movable arm and including normally closed contacts in the supply circuit, a movable element carried by the arm and responsive to the impact of said arm on the fixed member to engage and open said contacts, and means to regulate the time required by said element to effect the opening of said contacts.

13. Electric welding apparatus comprising a fixed member and a movable member each carrying welding electrodes and a timing device carried by the movable member and actuated by the impact of the movable member and the fixed member to determine the duration of the welding current.

14. Electric welding apparatus comprising a base, an arm fixed to said base carrying a welding electrode, an arm pivoted to said base carrying a coöperating welding electrode, a transformer having its core sections mounted on the base and movable arm respectively and adjacent to each other, leads from the secondary of said transformer to the respective welding electrodes, leads connecting the primary of the transformer to the source of supply, a relay normally interrupting said source of supply to the primary, a regulable timing device including normally closed contacts in said relay circuit and a movable member operated by the impact of the movable arm against a fixed portion of the machine to open said contacts, and means under control of an operator to close the circuit from the source of supply through the timing device and said relay.

In testimony whereof I affix my signature, in presence of two witnesses.

JOHN ALLEN HEANY.

Witnesses:
BERNARD C. BECKER,
FRED. B. MCLAREN.